Aug. 13, 1968     J. H. AUER, JR     3,397,305
APPARATUS FOR MEASURING VEHICULAR TRAFFIC LANE OCCUPANCY
Filed Aug. 14, 1964     3 Sheets-Sheet 1

INVENTOR.
J. H. AUER JR.
BY
HIS ATTORNEY

Aug. 13, 1968   J. H. AUER, JR   3,397,305
APPARATUS FOR MEASURING VEHICULAR TRAFFIC LANE OCCUPANCY
Filed Aug. 14, 1964                     3 Sheets-Sheet 2

INVENTOR.
J.H. AUER JR.
BY Forest B Hitchcock
HIS ATTORNEY

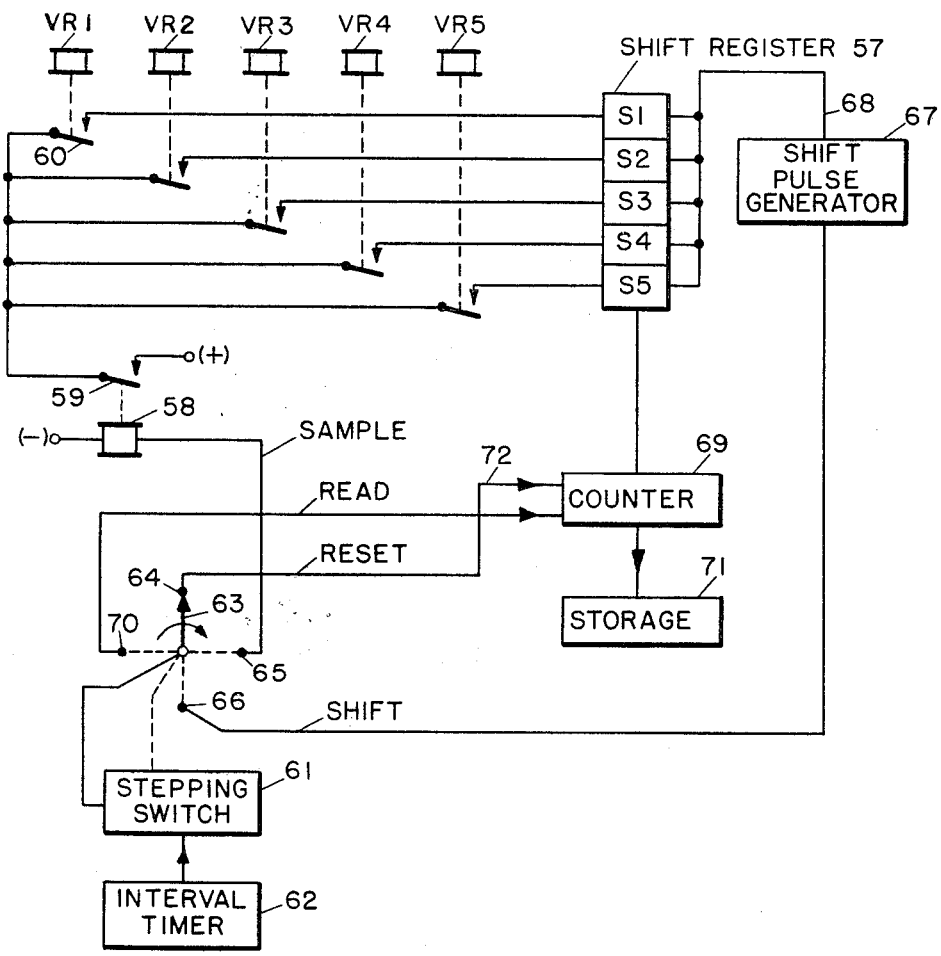

United States Patent Office 3,397,305
Patented Aug. 13, 1968

3,397,305
METHOD AND APPARATUS FOR MEASURING VEHICULAR TRAFFIC LANE OCCUPANCY
John H. Auer, Jr., Fairport, N.Y., assignor to The General Signal Corporation, Rochester, N.Y., a corporation of New York
Continuation-in-part of application Ser. No. 305,469, Aug. 29, 1963. This application Aug. 14, 1964, Ser. No. 389,588
18 Claims. (Cl. 235—150.24)

ABSTRACT OF THE DISCLOSURE

In one form, a capacitor is charged from a constant current source to add equal increments of charge for each increment of time a vehicle is detected at a given point in the highway. An interval timer periodically transfers the charge to said capacitor to another smaller capacitor and then discharges the first capacitor before beginning the next timed interval. Each timed interval is of course greater than the longest expected time of occupancy of the given point by a single vehicle. The signal across the smaller capacitor is of a value representative of lane occupancy for the successive intervals timed.

Another form provides a periodic pulse generator for repeatedly operating a shift register through its several steps. A vehicle detector registers that it is present during one or more of the periodic pulses by specially controlling the corresponding steps of the shift register during such pulses. The total number of specially controlled steps related to the total number of steps in the shift register gives the represented lane occupancy signal.

Other forms have somewhat different structure, but all forms are for providing a lane occupancy signal.

*Cross-reference to related applications*

This application is a continuation-in-part of the joint application of J. H. Auer, Jr. and L. A. Ross, Ser. No. 305,967, filed Sept. 3, 1963, now Patent No. 3,278,896 granted Oct. 11, 1966.

*Specification*

This invention relates to a method and apparatus for obtaining data relative to traffic congestion and, more particularly, relates to apparatus for measuring vehicular traffic lane occupancy.

The subject matter of this application is related to that of my copending application Ser. No. 305,469, filed Aug. 29, 1963, and with respect to such subject matter of this application which is in common with that disclosed in the earlier-filed application, I claim the benefits of 35 United States Code, Section 120.

The prior art disclosed both methods and apparatus for measuring several quite different traffic parameters, and also discloses the use of these parameters in the control of traffic systems and also in traffic surveillance systems. More specifically, the prior art discloses the measurement of traffic volume which is a measurement of the number of vehicles passing a given monitoring location on a highway in unit time such as the number of vehicles detected per minute or hour. One disadvantage of the traffic volume parameter is its failure to take into account vehicle speed, with the result that this parameter may be ambiguous with respect to the information it provides, since the same volume level may exist both at high and low levels of traffic congestion. Recognizing this disadvantage, apparatus has been developed which instead measures what is termed traffic "density," i.e. the number of vehicles per unit distance along the highway. Traffic density is a much more accurate representation of traffic congestion since it is affected not only by the number of vehicles passing a monitoring location in unit time, but is also affected by the speeds of such vehicles.

Nevertheless, even the traffic density parameter has its shortcomings. One of these has been the difficulty which has existed in measuring traffic density. One common way in which this is done is to determine separately traffic volume and vehicle speed at a given monitoring location and then to divide these two parameters, with the quotient being representative of traffic density. This requires that the vehicle detector used must be capable of measuring vehicle speed which often is a disadvantage since vehicle speed detectors are ordinarily more complex and more costly than detectors which merely sense the passing or presence of vehicles. Another disadvantage lies in the need to provide equipment capable of effecting division of the vehicle volume and vehicle speed parameters since apparatus which can carry out this computing function is fairly complex.

Still another disadvantage arises when it is desired that the computing functions involved in the determination of density for each of a relatively large number of detector locations shall be carried out at one central location. In this event it becomes necessary to telemeter vehicle speed signals from each detector location to the central location, and since the vehicle speed signals are ordinarily in the form of a Doppler beat frequency whose frequency value is dependent upon vehicle speed, a quite uneconomical use of communication circuits is involved since a separate channel must ordinarily be provided for each of the remote detectors and each such channel must have an appreciable band width to carry the alternating-current Doppler signal.

Moreover, the traffic density parameter has the disadvantage that it fails to take into account the variable length of different vehicles. This can be more readily appreciated when it is recognized that any given value of traffic density (vehicles per mile) may represent quite different amounts of actual traffic congestion dependent upon whether the vehicles constituting the traffic stream comprise a relatively large percentage of long vehicles such as trucks and buses, or very minor or zero percentage of such vehicles. Obviously, a given traffic density value may represent a high degree of traffic congestion where the traffic concerned is made up to an appreciable degree of long vehicles such as trailer-trucks; whereas, it may represent a considerably lower amount of traffic congestion when the traffic comprises entirely passenger vehicles.

In recognition of these various problems, I have devised apparatus for measurement of a traffic congestion parameter which overcomes these difficulties. This traffic parameter is termed "lane occupancy" and is a parameter whose value is proportional to the percentage of pavement occupied at any given time. One immediate advantage of such a parameter is that it automatically takes into account the particular nature of the traffic stream since, for the same number of vehicles per unit distance of highway, lane occupancy may assume different values in dependence upon the average length of the vehicles constituting the stream, so that it more accurately represents true traffic congestion than does density. Another important advantage resides in my discovery that this parameter of lane occupancy can be derived from a presence-type vehicle detector with no need to measure vehicle speed. This latter advantage results in a still further advantageous feature in that vehicle-presence detector information from a large number of vehicle detectors may be telemetered to a central location with an extremely economnical use of communication circuits since the signal transmitted from any one detector need only comprise a pulse for each detected vehicle with the pulse having a duration which is proportional to the length of time required for the vehicle to pass a given point which is normally the detection zone defined by the presence detector.

In the prior copending application of H. C. Kendall and J. H. Auer, Jr., Ser. No. 78,410, filed Dec. 27, 1960, now Patent No. 3,233,084, granted Feb. 1, 1966, there is disclosed a method and apparatus for measuring lane occupancy through the use of a presence-type vehicle detector. In such prior application, there is disclosed apparatus which comprises a signal accumulating means for continually storing a manifestation of the current value of lane occupancy. In the specific embodiment disclosed in that application, the signal-accumulating means comprises a storage capacitor, and an associated circuit adds to the stored manifestation in response to each vehicle detector at a rate proportional to the difference between the then-existing stored value and some predetermined higher reference value and does so throughout the vehicle presence interval demarcated by the respective detector; at all other times, i.e. non-detection periods, the accumulated lane occupancy manifestation is reduced at a rate proportional to its presence value. As is mathematically explained in the prior application, the result of this operation is to provide a manifestation in the signal accumulator means whose value is representative of lane occupancy, i.e. percentage of pavement occupied.

In my copending application previously referred to, Ser. No. 305,469, I have disclosed and claimed a method and apparatus for determining lane occupancy in response to vehicle detections by a presence-type vehicle detector, and through the use of a different circuit organization from that disclosed in application Ser. No. 78,410. Thus, I have found that the lane occupancy parameter may alternatively be measured by providing again a signal-accumulating means such as a capacitor, adding to the manifestation stored in the accumulating means at a constant rate throughout each vehicle-presence interval demarcated by the vehicle detector, while simultaneously reducing the accumulated manifestation at all times at a rate proportional to the existing value of said manifestation.

More specifically, I disclosed in such patent application Ser. No. 305,469 a circuit organization which includes a capacitor for the signal accumulating means, an associated circuit to add electrical charge to the capacitor at a constant rate throughout each vehicle-presence interval demarcated by the presence-type vehicle detector, and another associated circuit to discharge the capacitor continually through a shunting resistor.

In the instant patent application, I disclose further alternative apparatuses by which the traffic parameter of lane occupancy may be measured. These alternative embodiments include those in which the computed value of lane occupancy is not presented as a continuously varying signal, but rather, one in which a signal of constant value is available at each instant of time, with this constant-value signal representing the lane occupancy as measured over a predetermined, preceding time interval. Additional embodiments of my invention disclosed herein relate to apparatus for measuring lane occupancy which are more particularly of a digital nature as opposed to those of my previous patent applications which are essentially of an analog nature. In this present application I disclose apparatus for measuring lane occupancy through the use of digital techniques, and also apparatus wherein a running average of lane occupancy is maintained.

It is thus an object of the invention to provide lane occupancy measuring apparatus wherein lane occupancy is measured over a predetermined measuring interval by, in effect, determining the cumulative vehicle detection time of a vehicle-presence detector during such interval and providing a measure of such cumulative time during the immediately following measuring interval and until a further measurement has been made.

It is another object of this invention to provide lane occupancy measuring apparatus in which a running average of lane occupancy is provided with the present value of lane occupancy being modified on a continuous basis with the passage of time.

It is a further object of this invention to provide lane occupancy measuring apparatus wherein a plurality of vehicle-presence detectors is employed along a highway and lane occupancy is determined by adding to the present value of the lane occupancy manifestation at a given rate for each detector which is in a vehicle-detecting condition and throughout the vehicle-detector time of such detector, while at the same time, the accumulated quantity is being constantly decreased at a rate proportionate to its existing value.

A still further object of this invention is to provide lane occupancy measuring apparatus wherein a plurality of vehicle detectors is situated at intervals along a highway and lane occupancy is measured by repeatedly determining what portion of such plurality of detectors is in a vehicle-detecting condition.

It is another object of this invention to provide lane occupancy measuring apparatus in which a running average of a digital representation of lane occupancy is provided, with the running average being periodically updated in accordance with a measurement made of lane occupancy as measured during a just-concluded measuring interval.

Other objects, purposes, and characteristic features of the invention will be apparent from the drawings and described in the accompanying specification.

Referring to the drawings:

FIG. 6 illustrates another modification of my invention providing for the measurement of lane occupancy along a highway which employs a plurality of spaced vehicle-presence detectors, which apparatus includes a shift register and provides a digital representation of lane occupancy.

Figure 1:
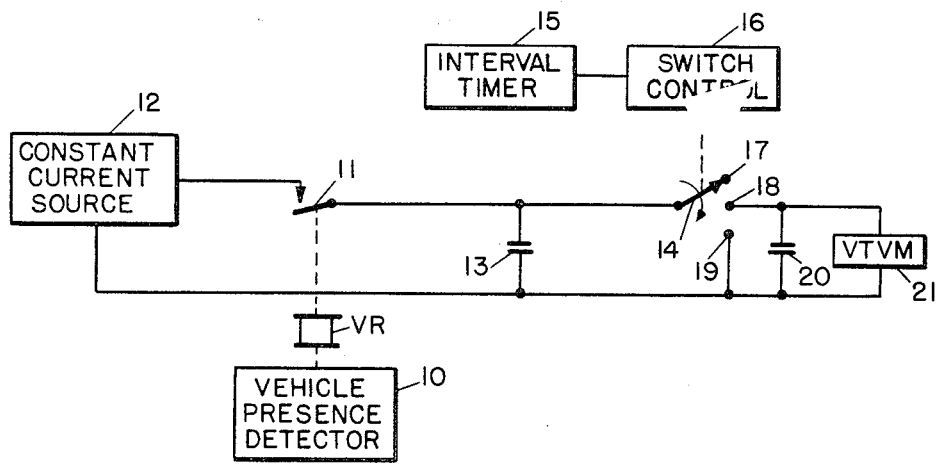
FIG. 1 is a circuit diagram of one embodiment of my invention employing a capacitor to store an analog representation of lane occupancy.

Referring to FIG. 1, a vehicle-presence detector 10 is shown in block diagram form, and this detector has an associated relay VR. The detector 10 may be of any of several known forms of vehicle-presence detectors and may comprise a so-called loop detector, photocell detector, or may be of the sonic type as shown, for example, in the Kendall et al. Patent No. 3,042,303. The common characteristic of such presence-type detectors is that they demarcate, in response to each vehicle passing through a detection zone associated with the detector, an interval whose length is substantially proportional to the length of time required for the vehicle to pass through said detection zone. Thus, detector 10 controls the associated vehicle relay VR in such a manner that this normally deenergized relay is picked up throughout the time required for each vehicle to pass through a detection zone demarcated by detector 10.

The vehicle relay VR has a contact 11 which, when closed, connects a constant-current source 12 to the upper terminal of a storage capacitor 13. Under normal conditions, when no vehicle is being detected by detector 10, relay VR is dropped away, its front contact 11 is open, and constant current source 12 is disconnected from capacitor 13. However, when a vehicle is detected, relay VR picks up to close its front contact 11, and an increment of electric charge is added to capacitor 13. Because of the constant-current characteristic of source 12, the charging of capacitor 13 takes place at a constant rate throughout the closure time of contact 11 despite the fact that capacitor 13 may be charged to different voltage levels at different times.

The just-described condition whereby capacitor 13 is charged at a constant rate throughout each vehicle detection period is that which normally takes place throughout each successive measuring interval demarcated by interval timer 15. While timer 15 is measuring each such interval, it controls the switch control unit 16 to maintain its associated contact 14 in a position where it makes contact with the fixed contact point 17, thereby providing an open circuit at contact 14.

As will soon be described, at the start of each measuring interval demarcated by timer 15, capacitor 13 is wholly discharged. Because of this, at the end of each demarcated measuring interval, the amount of charge which has been acquired by capacitor 13 is related to the cumulative closure time of front contact 11 of relay VR throughout the measuring interval. In other words, the charge acquired by capacitor 13 at the end of each measuring interval is representative of the total vehicle detection time during the interval and is thus also representative of the percentage of pavement occupied as measured during the just-ended measuring interval.

At the conclusion of each interval demarcated by timer 15, an output signal is supplied by the timer to switch control 16 which immediately causes the rotatable contact 14 to move in succession from the fixed contact point 17 to the fixed contact points 18 and 19, thereafter returning immediately to the normal position where contact is made with contact point 17. Thus, the switch control 16 may comprise a stepping switch which normally rests with its rotatable contact 14 in the position shown in FIG. 1 but which, upon receipt of an initiating impulse from interval timer 15, makes one revolution, successively contacting the fixed contacts shown, before returning to its original position where it stops.

At the instant that contact 14 moves from fixed contact 17 to fixed contact 18, the charged capacitor 13 is connected in parallel with another capacitor 20 whose value of capacitance is very much less than that of capacitor 13. Therefore, although capacitor 20 is thus very rapidly charged to a voltage which equals that which then exists across the terminals of capacitor 13, the transfer of charge from capacitor 13 to capacitor 20 involves only a relatively small amount of charge transfer so that there is but an insignificant change in voltage across capacitor 13 as capacitor 20 is charged. Immediately after this, contact 14 makes contact with fixed contact 19 which short-circuits capacitor 13, thereby restoring capacitor 13 to its original, non-charged state.

In the meantime, however, the voltage across capacitor 20 is constantly being measured by a measuring instrument which is preferably of a type which presents substantially zero load across the capacitor so that the value of voltage across its terminals cannot vary significantly during the measuring interval. Such a device may comprise a vacuum tube voltmeter 21 having an indicating means which continually provides a measure of the magnitude of voltage across capacitor 20, which indication may be calibrated in terms of percentage lane occupancy.

Figure 2:
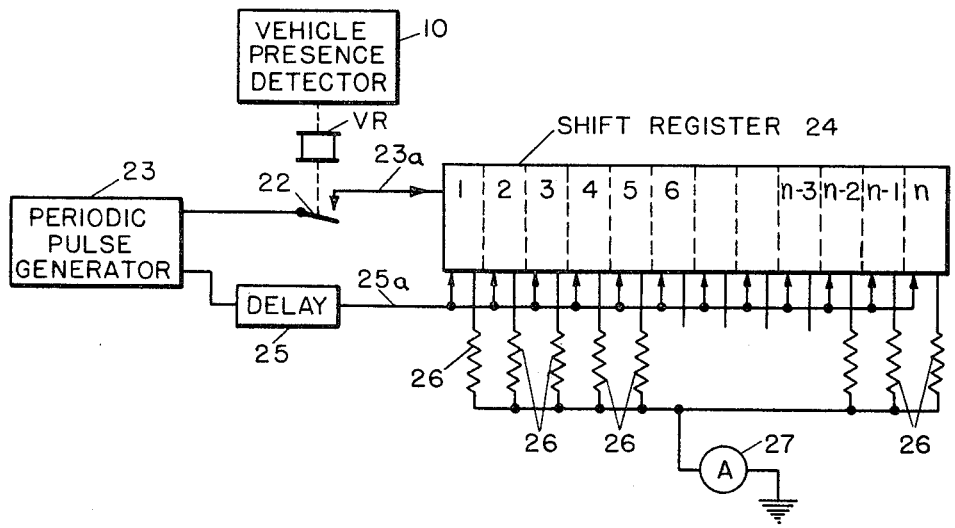
FIG. 2 is a circuit diagram of an alternative form of my invention disclosing a digital type of lane occupancy measuring apparatus and including a shift register.

In the alternative embodiment of FIG. 2, the vehicle presence detector 10 again controls its associated relay VR so that the latter picks up throughout the time a vehicle is occupying the associated detection zone. In this embodiment, a front contact 22 of relay VR connects the periodic pulse generator 23 to the data input lead 23a of shift register 24 throughout each vehicle detection period. Each output pulse of the pulse generator 23 is also supplied through delay circuit 25 to the shift input lead 25a of the shift register 24. For every output pulse of pulse generator 23 which occurs at a time when front contact 22 of relay VR is open, no input pulse can be applied to the first stage of the shift register upon its data input lead 23a; however, each such pulse nevertheless produces a delayed pulse at the shift input lead 25a of all the shift register stages. On the other hand, whenever relay VR is picked up, each output pulse of pulse generator 23 produces an input pulse on the data input lead 23a of the first stage of the shift register and shortly thereafter also produces a corresponding pulse on the shift input lead 25a, with the delay between the two being determined by the delay circuit 25.

The operation of the circuit of FIG. 2 is such that there is, in effect, a code which is continually present in the shift register 24 and is continually being shifted throughout the shift register. Assuming that the periodic pulse generator produces pulses at a sufficient rate so that, even for the shortest expected vehicle detection period, there will be a plurality of pulses produced by the periodic pulse generator 23, then the shift register will effectively receive the "1" digits for each detected vehicle and with the number of such successive "1's" being directly proportional to the closure time of front contact 22. When no vehicle is present and front contact 22 is open, then a series of "0's" is applied to the shift register. Irrespective of whether or not a vehicle is being detected at any instant, each pulse provided by pulse generator 23 produces a shift in the shift register, transferring the "0" or "1" condition of each stage to the immediately adjacent stage to the right.

The shift register 24 may have a relatively large number of stages, and FIG. 2 diagrammatically shows that "n" stages are provided. The number of stages which, in practice, may be necessary is dependent not only upon the rate at which pulses are produced by pulse generator 23 but is also a function of the averaging period that is desired.

As time elapses, the code of "0's" and "1's" is shifted through the shift register, with each code character being in effect, erased therefrom as it is shifted out of the "nth" stage. At any instant, therefore, the number of stages of the shift register which are in the "1" condition is representative of the cumulative vehicle detection time of detector 10 during a predetermined interval. Thus, in contrast to the embodiment of FIG. 1, there is no periodic measuring interval demarcated in the embodiment of FIG. 2; instead, the shift register 24 provides a measure of percentage lane occupancy for a continuously running measuring interval whose duration is a function of the pulse rate of the pulse generator 23 and of the number of stages provided in shift register 24.

The measurement of lane occupancy by determination of the number of stages of the shift register which are at any time in a "1" condition can be effected in any of numerous ways known to one skilled in the art. One possible way in which they can be accomplished is to connect each individual stage of the shift register through a resistor 26 to one terminal of a milliammeter, with the other terminal thereof grounded. Any shift register stage in the "1" condition thus contributes an increment of current to the milliammeter 27, while any remaining stage which is in the "0" condition contributes no such increment with the result that the total current measured by milliammeter 27 represents the number of shift register stages which are at any one instant in the "1" condition.

In the embodiment of FIG. 2, it may be assumed, for example, that the shortest expected vehicle detection interval is approximately one-fifth of a second since this is about the length of time required for a vehicle of 17 foot length and traveling at 60 miles per hour to pass a given point. If it is desired that a minimum of four pulses be provided by the pulse generator 23 during such minimum detection interval, then the pulse generator 23 should be controlled to supply pulses at the rate of 20 pulses per second. Accordingly, if 60 stages are used in the shift register, i.e. $n=60$, then the running measuring interval over which lane occupancy is continually measured is three seconds. Of course a longer measuring interval can be obtained by using a shift register having a greater number of stages.

It is well to note that the circuit of FIG. 2 effectively computes lane occupancy by a division operation. In other words, assuming $n$ stages in the shift register, if a "1" exists in each of these stages, the lane occupancy indicated therefrom could be written $n/n$. If less than $n$ stages contain a "1," as for example $m$ stages, then the lane occupancy indication may be represented by $m/n$.

Stated in another way, a predetermined measuring interval is demarcated by the shift register and its duration corresponds to the length of time that is required for a single input pulse to be shifted through all the stages of the shift register. Throughout any such interval, a number of stages of the shift register will be operated to their "1" condition, and the number of such stages which are in their "1" condition, as compared to the total number of stages in the shift register, is representative of the value of lane occupancy.

As a numerical example, assuming again that shift register 24 contains 60 stages, assume that four vehicles have been detected within a three second period. Assume that the first vehicle was detected for a period extending over 8 pulses, the second vehicle for a period extending over 12 pulses and the third and fourth vehicles each extending over periods of 5 pulses, with the pulse generator supplying pulses at the rate of 20 pulses per second. Under these conditions, the shift register has stored therein 30 pulses (or "1's") out of a total period of 60 pulses. Thus, the lane occupancy reading supplied therefrom may be represented by 30/60, which is 50% lane occupancy.

Heretofore, we have been concerned primarily with measuring lane occupancy by measuring the proportional amount of time that a single detector is indicating vehicle presence. Obviously, the instantaneous condition of a single presence detector cannot in itself give accurate occupancy data since that one detector is always indicating either the presence or absence of a vehicle and this makes it necessary to average over a rather considerable time the data received from the single detector in order to obtain fairly accurate lane occupancy information. Thus, it can be said that the single detector can approach the goal of giving lane occupancy data only in a rather indirect manner by measuring at one given point and over some measuring interval the proportionate amount of time that the pavement is occupied at that particular point.

As another extreme, true spatial lane occupancy could be provided by installing a large number of very closely spaced detectors along a highway. If this were done, one could obtain true spatial lane occupancy at an instant of time since this large number of detectors could at any given instant indicate how much of the lane was vehicle occupied, and it would then not be necessary to provide an any time averaging of the detector output information. Inbetween these two extremes, it is possible to provide, with a plurality of detectors, a measurement of lane occupancy which approaches true spatial lane occupancy, and with the necessity to provide time averaging diminishing as the number of detectors per unit distance along the lane increases.

In the accompanying drawings there are illustrated several ways in which this so-called modified spatial lane occupancy can be obtained by using a plurality of spaced presence detectors. In these several schemes, there are shown both analog and digital means for accomplishing this.

Figure 3:
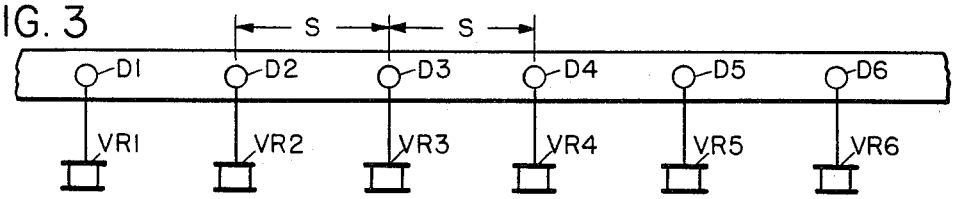
FIG. 3 is a diagrammatic representation of a highway lane having a plurality of spaced vehicle-presence detectors.

In FIG. 3, there is shown diagrammatically a stretch of highway with a plurality of vehicle detectors D1–D6 whose respective detection zones are quite closely spaced, the distance between the successive zones being represented by "S." Each detector controls a respective one of the relays VR1–VR6, energizing such relay throughout the time the associated detection zone is occupied.

Figure 4:
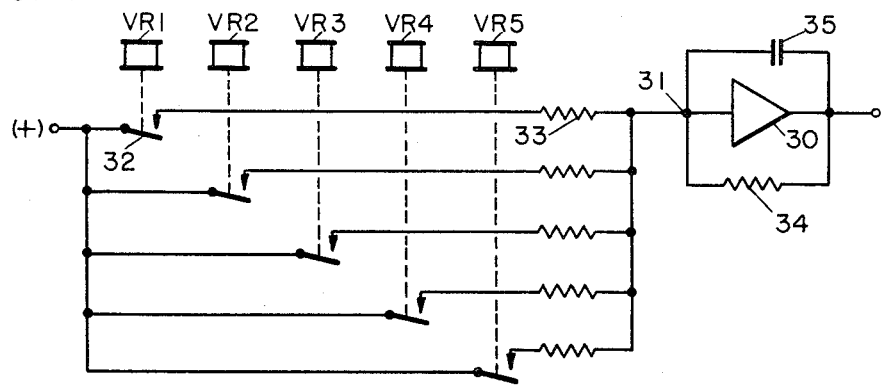
FIG. 4 illustrates an embodiment of my invention wherein an operational amplifier is employed and receives input signals from each of the plurality of vehicle-presence detectors shown in FIG. 3.

FIG. 4 illustrates how the various relay contacts associated respectively with the various vehicle detectors of FIG. 3 may be arranged to provide separate inputs to an operational amplifier 30. When any one detector relay contact is closed, current is applied to the summing point 31 of the amplifier 30 through that contact and an associated input resistor. For example, whenever detector relay VR1 is detecting the presence of a vehicle, its front contact 32 is closed so that current is supplied to the summing point 31 through resistor 33. A similar circuit path, including an equal value of resistance in each is closed when any other of the relays V2–V6 is picked up. Since the fixed resistance of resistor 34 shunts amplifier 30, the output voltage is directly proportional to the number of detector contacts that are closed at any instant. If there is a very large number of detectors in the system, the output voltage will have a quite small "grain size," and it may be used directly as a measure of lane occupancy in such circumstances; there is then no need to provide any time averaging by means of a resistance-capacitance filter. However, as the number of detectors decreases, the "grain size" will increase and it then becomes desirable to provide time averaging of the output voltage which is preferably accomplished by a capacitor 35 shunting the amplifier as shown in FIG. 4. Alternatively, this averaging can also be accomplished by connecting a resistance-capacitance filter to the amplifier output.

Figure 5:
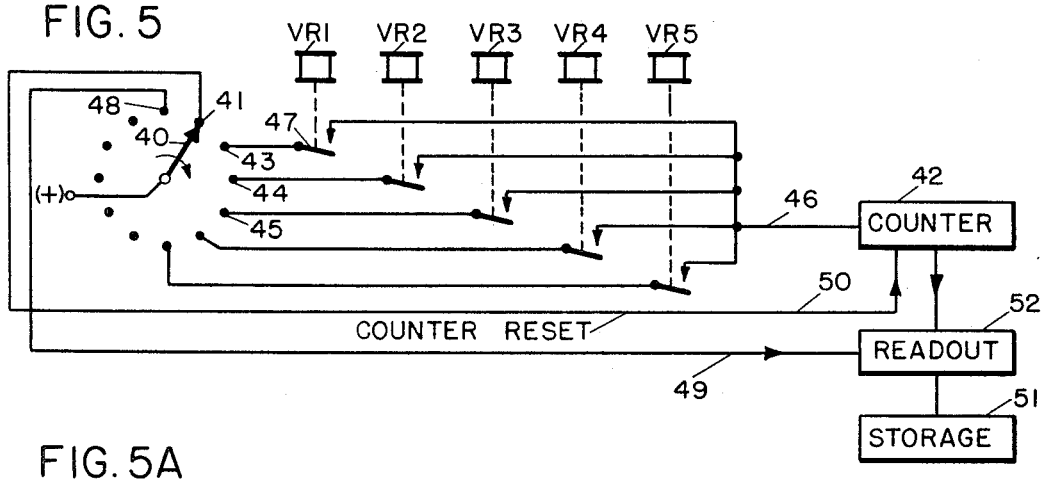
FIG. 5 illustrates a digital type of lane occupancy measuring apparatus which periodically counts the number of the plurality of vehicle detectors along a highway lane which are in a vehicle-detecting condition, to thereby provide a measure of lane occupancy.

FIG. 5 discloses a further embodiment of the invention in which percentage lane occupancy is determined in a system having a relatively large number of vehicle presence detectors by determining periodically what percentage of the total number of detectors is then registering a vehicle. To one skilled in the art, various ways will suggest themselves as to how one may determine at any instant what percentage of a given number of relays, for example, is in a picked-up condition. FIG. 5 illustrates how this may be accomplished in a relatively simple manner by using a stepping switch which repeatedly goes through a cycle of operation and on each cycle detects how many of the various vehicle detector relays are in a vehicle-detecting state.

In FIG. 5, the stepping switch is denoted by a contact 40 which is represented as rotating in a clockwise direction. The contact is shown as initially making contact with a fixed contact point 41 so that energy is applied from the (+) terminal to a counter reset input of counter 42 which has the effect of resetting this counter to its "0" count every time that rotating contact 40 makes contact with fixed contact 41.

As contact 40 continues its rotation, it makes contact successively with fixed contact points 43, 44, 45, etc. On each of these successive positions, a circuit may be closed to the input lead 46 of counter 42 provided that the associated vehicle detector relay is then detecting a vehicle. For example, at the instant that rotating contact 40 makes contact with fixed contact 43, a circuit is completed to place energy upon lead 46 and advance counter 42 by one unit provided that relay VR1 is then picked up and its front contact 47 is closed. It will be apparent, therefore, that on each cycle of rotation of contact 40, counter 42 will receive a number of input counts which represents the number of relays out of the group VR1–VR5 that was in a vehicle detecting condition when scanned. It will further be evident that, if a large number of vehicle detectors is employed, the count registered by counter 42 at the end of each complete scan by contact 40 will indicate what percentage of the vehicle detectors are detecting vehicles, thereby providing a measure of lane occupancy.

In FIG. 5, when contact 40 reaches the fixed contact point 48, energy is applied to lead 49 which then energizes the read-out unit, thereby effecting a read-out of whatever count is then stored in counter 42 to the storage unit 51. Immediately after this happens, contact 40 reaches the position shown in FIG. 5, where energy is applied to lead 50, thereby resetting counter 42 to its "0" count so that another counting cycle can begin. From this time, however, and until contact 40 again goes through a subsequent cycle of operation, storage unit 51 continuously registers the count it has just received from counter 42.

In the system of FIG. 5, it has been assumed that the stepping switch operates contact 40 continuously. Consequently, the measuring interval is the time required for the stepping switch to go through a complete cycle of operation since, every time this occurs, a different count is transferred from counter 42 through read-out unit 52 to the storage unit 51. If the stepping switch operates rapidly, going through a complete cycle in perhaps only a few seconds, then the count registered by counter 42 represents the number of vehicle detectors which were found to be in a vehicle registering condition throughout such interval. Such a rapid scanning rate may, however, result in an averaging interval which is of too short a duration, resulting in too frequent a change in the percentage lane occupancy reading in the storage unit 51. If the stepping switch operates at a substantially slower rate, then the successive detectors are successively examined at intervals which are quite appreciably spaced from one another so that the count registered in counter 42 fails to represent the percentage of the plurality of detectors which is at any time registering presence of a vehicle. In any event, the situation must be avoided where the rate of scanning is so slow that a single vehicle would be registered by each of the successive detectors at the time each detector is scanned by the stepping switch, since this would present an entirely erroneous representation of lane occupancy. To guard against this, the system of FIG. 5 may be so arranged that the order in which the successive detectors is scanned is opposite to that in which they are successively encountered for the assumed direction of travel. In other words, if the detectors are scanned in the order shown in FIG. 5, i.e. D1, D2 . . . D6 (see FIG. 3), then the assumed direction of travel for the traffic lane shown in FIG. 3 should be from right to left since this will positively preclude the counting of a vehicle at the time it occupies the detection zone associated with detector D4 and immediately subsequent to this, having that same vehicle detected by the detector D3 and registered again upon counter 42.

Figure 5A:
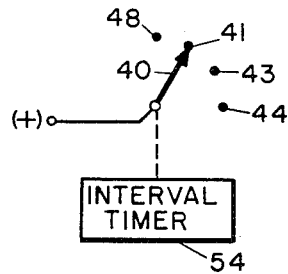
FIG. 5A is a modification of FIG. 5.

FIG. 5A illustrates a modification of the embodiment of FIG. 5 in that an interval timer 54 is employed to demarcate successive measuring intervals. At the end of each demarcated interval, the timer 54 sets stepping switch 40 into operation, whereupon it makes a rapid scan of all the detector relays VF1-VR5 so as to count the number of those which are in a vehicle detecting condition at the time of the scanning as in FIG. 5. When the stepping switch reverts to its normal condition, shown in FIG. 5, the count placed into counter 42 during the just-ended scan is transferred to storage unit 51 which then provides a measure of lane occupancy which is not disturbed until another measuring interval is terminated, with the start of another scanning cycle of the stepping switch 40.

In FIG. 6, the various detector relays VR1-VR5 of FIG. 3 are shown as selectively applying inputs in parallel to respective stages of a shift register 57. The parallel read-in to the shift register occurs when relay 58 picks up and closes its front contact 59, since this permits energy to be applied from the (+) terminal through a contact of whichever one of the detector relays is then picked up, to a respective one of the shift register stages S1-S5. At this time of parallel read-in, for any detector relay such as relay VR1 which is then picked up, the application of electrical energy through the closed front contact 60 of such relay will operate the associated shift register stage S1 from its "0" to its "1" condition.

The energization of relay 58 is controlled by a stepping switch 61 which, in turn, is controlled to begin a cycle of operation at the conclusion of periodic measuring intervals demarcated by interval timer 62. Normally, the rotating contact 63 of stepping switch 61 rests in a position where it makes contact with the fixed reset contact 64. However, when this stepping switch is set into operation at the end of each interval demarcated by timer 62, contact 63 moves to the fixed contact position 65 which then momentarily energizes relay 58 to provide for the parallel read-in data to the shift register, as already described. Immediately thereafter, contact 63 moves to the fixed contact position 66 which supplies energy to shift pulse generator 67. This may be a gating input which enables this generator 67 to produce repetitive output pulses on lead 68 which applies a shift pulse to all stages of shift register 57.

Since the parallel read-in of information to the shift register 57 has, in effect, applied a variable code of "1's" and "0's" to the respective shift register stages and with the number of "1's" being representative of the number of vehicle detectors that were detecting a vehicle at the instant that relay 58 picked up, the shifting of this code out of the shift register 57 in response to the shift pulse causes a code of "0's" and "1's" to be applied in sequence to counter 69. Counter 69 registers one additional count for each "1" digit in the output code but fails to advance the count for every "0" digit in such code. Thus, when the shift is complete, counter 69 will register a count which was representative of the number of vehicle detectors that were detecting a vehicle presence at the instant that relay 58 picked up.

Shortly thereafter, contact 63 of stepping switch 61 moves to its fixed contact position 70 at which time an enabling voltage is applied to counter 69 thereby controlling this counter to transfer the count then registered therein to the storage unit 71.

Following this, the counter 69 can be restored to zero, and this is accomplished when stepping switch 61 operates contact 63 to its original position where it makes contact with fixed contact 64. A resetting voltage is then applied over lead 72 to counter 69 to reset the latter to zero.

In FIG. 6, the system provides for an instantaneous sampling of all the vehicle detectors to determine what percentage of these is then registering a vehicle presence. The time interval demarcated by timer 62 establishes the duration of the averaging interval, and the count appearing in storage unit 71 may be calibrated in terms of percentage lane occupancy.

Having described several embodiments of circuit organizations for the measurement of lane occupancy, I wish it to be understood that various modifications and alterations may be made to the specific form shown without in any manner departing from the spirit or scope of my invention.

What I claim is:

1. Apparatus for measuring the traffic congestion parameter of lane occupancy comprising in combination, at least one vehicle presence detector defining an associated detection zone and demarcating the time each vehicle occupies said detection zone, a storage capacitor, a constant-current source, first means for charging said capacitor from said source throughout each vehicle detection period, timing means for demarcating successive measuring intervals of predetermined length, second means controlled by said interval demarcating means and responsive at the end of each measuring interval to the voltage acquired by said capacitor during the just-ended measuring interval, further means controlled by said demarcating means for discharging said capacitor at the beginning of each measuring interval, said second means providing a manifestation of vehicle lane occupancy for the just-concluded measuring interval and until a successive one of said measuring intervals has been demarcated by said timing means.

2. The combination of claim 1 in which said second means includes a second capacitor and means for charging said second capacitor to the voltage to which said first-named capacitor is charged prior to its being discharged by said further means, and measuring means responsive to the voltage across said second capacitor.

3. Apparatus for use in combination with a vehicle presence detector of the type which demarcates the occupancy time of each vehicle passing through an associated detection zone and wherein said apparatus measures a traffic congestion parameter, said apparatus comprising a constant-current source, a storage capacitor, means controlled by said presence detector for charging said capacitor from said constant-current source throughout each vehicle detection period, means for demarcating successive measuring intervals each of predetermined duration, and means controlled by said interval measuring means and effective once each said measuring interval to measure the voltage across said storage capacitor and thereafter to discharge said capacitor, said last-named means including storage means continually storing a manifestation representative of the magnitude of the voltage across said capacitor immediately prior to its being discharged.

4. Apparatus for measuring the traffic congestion parameter of lane occupancy comprising, in combination, at least one vehicle presence detector demarcating the occupancy time of each vehicle passing through a detection zone defined by said detector, a shift register having a plurality of iterative bistable state stages and having a first input lead and a second input lead, said shift register being of the type in which the application of a pulse on said first input lead alters the condition of the first stage of said shift register from one of its stable states to the other and the application of a pulse on the second of said leads shifts the then-existing condition of each stage to the next successive stage, a source of repetitive pulses, means controlled by said vehicle detector for applying pulses from said source to said first lead throughout each vehicle detection period demarcated by said detector, and means for supplying pulses from said source to said second lead at all times, and further means responsive to the number of stages of said first register which are at any time in their abnormal states for producing a manifestation of lane occupancy.

5. The apparatus as defined in claim 4 in which said pulse source produces said repetitive pulses at a rate high enough to ensure that at least a plurality thereof will occur in the shortest expected occupancy time of a vehicle in said detection zone.

6. A system for measuring the traffic congestion parameter of lane occupancy on a selected traffic lane complising in combination: a plurality of vehicle presence detector means at spaced intervals along said lane each demarcating the occupancy time of a vehicle in an associated vehicle detection zone; and means responsive to the number of said detector means which is at any time detecting the presence of a vehicle for producing a manifestation representative of lane occupancy; said responsive means including sequential scanning means, counting means, and said scanning means in turn operatively connecting each said detector means to said counting means for adding a count to said counting means provided that said detector means is then detecting the presence of a vehicle; means for at times resetting said counting means; and means responsive at least in part to the count acquired by said counting means before its being reset to provide a manifestation of lane occupancy.

7. The apparatus of claim 6 which further includes timing means for measuring successive measuring intervals, said timing means once each demarcated interval initiating operation of said scanning means, said scanning means at the end of each scanning operation coming to an at-rest condition.

8. Apparatus for measuring the traffic congestion parameter of lane occupancy comprising in combination, a plurality of vehicle presence-type detector means located at spaced intervals along said lane, a shift register having at least one bistable state stage for each of said vehicle detector means, means for periodically controlling said shift register to operate each of its stages to a normal state, said last-named means at times selectively connecting all said vehicle detector means to their respective shift register stages to operate to the abnormal state all those stages of said shift register which are repetitively associated with a vehicle detector means which is then registering the presence of a vehicle in its associated detection zone, a source of shift pulses for said shift register, said last-named means after selectively operating the stages of said shift register to an abnormal state applying shift pulses from said shift pulse source to said shift register, a counter connected to the final output stage of said shift register and registering the number of times that said final stage is operated to its abnormal state during the time that said shift pulses are applied to said shift register, said last-named means further acting to reset said counting means prior to its operating any of said shift register stages at their abnormal states, and means which is at times responsive to the count registered by said counting means for providing a representation of lane occupancy.

9. Apparatus for measuring lane occupancy comprising, a plurality of presence-type vehicle detectors located at spaced intervals along said lane, means for at times counting the number of said detectors which is detecting the presence of a vehicle, and means controlled by said counting means for providing a representation of lane occupancy.

10. The apparatus of claim 9 in which said last-named means includes averaging means responsive to the successive counts of said counting means for producing said lane representation as a time average of the successive counts of said counting means.

11. The apparatus of claim 9 in which said counting means includes: a shift register having a series of bistable state stages, each associated with a respective one of said vehicle detectors; means for periodically operatively coupling each said detector to its associated shift register stage to operate said stage to a particular one of its sable states only provided that the associated detector is in a vehicle detecting condition, whereby a distinctive combination of code characters is placed in said shift register, and means for shifting said code out of said shift register and into a counter to thereby provide a count of the number of said detectors which is in a vehicle detecting condition.

12. Apparatus for measuring the traffic parameter of lane occupancy comprising in combination: at least one vehicle presence detector situated to monitor a stream of traffic and demarcating the length of each separate interval during which each vehicle in said stream is detected; an electronic summing integrator having a plurality of input terminals, said integrator including an operational amplifier having an input and an output, feedback capacitor means coupling said input to said output, and a separate resistor coupling each integrator input terminal to said input; means coupling each detector to a separate input terminal respectively for supplying a predetermined amount of electrical current to said integrator throughout each vehicle detection interval demarcated by the respective vehicle detectors; and means responsive to the output of said amplifier for continually reducing the output voltage of said amplifier at a rate proportional to the existing value of said output voltage.

13. The apparatus for measuring the traffic parameter of lane occupancy of claim 12 wherein said means responsive to the output of said amplifier comprises a resistor.

14. Apparatus for measuring the traffic parameter of lane occupancy comprising in combination, a source of constant voltage, a vehicle presence detector situated to monitor a stream of traffic and demarcating the length of each separate interval during which each vehicle in said stream is detected, an operational amplifier having an input and an output, feedback capacitor means coupling said input to said output, resistor means coupled to said input, switching means responsive to said detector for coupling said voltage source to said resistor means, and means responsive to the output of said operational amplifier for continually reducing the output voltage of said amplifier at a rate proportional to the existing value of said output voltage.

15. The apparatus for measuring the traffic parameter of lane occupancy of claim 14 wherein said means responsive to the output of said operational amplifier comprises resistor means connected in shunt with said capacitor means.

16. Apparatus for measuring the traffic parameter of lane occupancy comprising in combination, at least one vehicle presence detector defining a detection zone and demarcating the length of time that each vehicle occupies such detection zone, an integrating operational amplifier having an input summing terminal and an output terminal, means coupling each said detector to said input summing terminal for supplying a predetermined amount of electrical current to said summing terminal throughout each vehicle detection period demarcated by the respective vehicle detector, and means for continually reducing the output voltage of said amplifier at said output terminal at a rate proportional to the existing value of said voltage, whereby the value of voltage at said output terminal is representative of lane occupancy.

17. The method of measuring lane occupancy which comprises the steps of: (A) measuring the time period required for each vehicle passing in succession along the lane to pass a given point; (B) demarcating a predete mined interval substantially in excess of the maximu expected interval measured in accordance with step (A and (C) generating a signal having a value substantial proportional to the ratio of the cumulative time perio measured according to step (A) throughout the interv demarcated according to step (B) to the total duratic of such time interval demarcated according to step (B whereby the signal so generated has a value represent tive of highway lane occupancy.

18. The method of measuring highway lane occupanc comprising the steps of: (A) measuring the time interv required for each vehicle traveling along the lane to pa: a given point; (B) demarcating a period of time substai tially in excess of the longest expected interval measure according to step (A); (C) generating discrete signals wit a repetition rate sufficiently high to ensure that at least plurality of such discrete signals is generated in the shor est expected interval measured according to step (A) (D) generating a signal having a value substantially pr( portional to the ratio of the number of said discrete si nals occurring during the cumulative time intervals mea: ured according to step (A) throughout the interval mea: ured according to step (B) to the total number of suc discrete signals generated throughout such interval; wher by the value of the signal so generated according to ste (D) is substantially proportional to highway lane o( cupancy.

References Cited
UNITED STATES PATENTS 2,473,542   6/1949   Philpott.
2,835,809   5/1958   Taylor.
3,233,084   2/1966   Kendall et al. _____ 235—150.2

MALCOLM A. MORRISON, *Primary Examiner.*

W. M. JOHNSON, *Assistant Examiner.*